Figure 1:
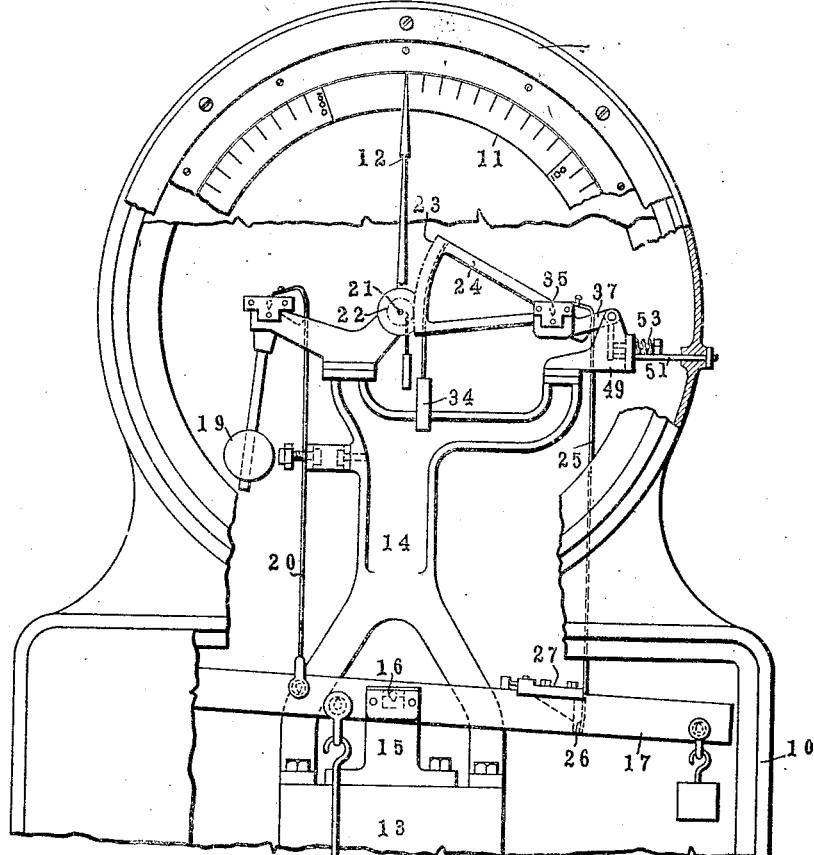

Jan. 19, 1926.  1,570,074

L. A. OSGOOD ET AL

SCALE

Filed Feb. 14, 1924   3 Sheets-Sheet 1

INVENTOR
Louis A. Osgood & Elmer E. Wolf
BY
Duell, Warfield & Duell
ATTORNEY

Jan. 19, 1926. 1,570,074
L. A. OSGOOD ET AL
SCALE
Filed Feb. 14, 1924    3 Sheets-Sheet 2

Jan. 19, 1926.　　　　　　　　　　　　　　1,570,074
L. A. OSGOOD ET AL
SCALE
Filed Feb. 14, 1924　　　3 Sheets-Sheet 3

INVENTOR
Louis A. Osgood
BY
ATTORNEY

Patented Jan. 19, 1926.

1,570,074

UNITED STATES PATENT OFFICE.

LOUIS A. OSGOOD, OF HARTFORD, CONNECTICUT, AND ELMER E. WOLF, OF SPRINGFIELD, OHIO, ASSIGNORS TO E. AND T. FAIRBANKS AND COMPANY, OF ST. JOHNSBURY, VERMONT, A CORPORATION OF VERMONT.

SCALE.

Application filed February 14, 1924. Serial No. 692,673.

*To all whom it may concern:*

Be it known that we, LOUIS A. OSGOOD and ELMER E. WOLF, citizens of the United States, residing at Hartford and Springfield, respectively, in the counties of Hartford and Clarke, respectively, and States of Connecticut and Ohio, have invented certain new and useful Improvements in Scales, of which the following is a full, clear, and exact description, such as will enable others skilled in the art to which it appertains to make and use the same.

This invention has reference to a scale and aims to provide certain improvements over mechanisms of this character as heretofore constructed.

It is an object of the present invention to furnish a scale in which the registering mechanism will be operated in an improved manner to indicate the true weight value of an article placed in association with the load receiving portion of the scale.

It is a further object to provide a structure of the type stated in which the mechanism will be of such character that the same may be caused to accurately register the weight value of the load throughout the entire range of the scale.

A still further object is to be predicated to the construction of a scale mechanism, the parts of which are capable of being properly correlated in order to insure the accuracy of the registered result.

Another object is that of incorporating an improved construction by means of which the readings may be corrected to compensate for errors on the part of the mechanism which may occur incident to normal usage.

Still another object is that of providing a scale having a registering mechanism operated by the weighing mechanism, the construction involved in this scale being such that the force with which one of the mechanisms is actuated may be varied without correspondingly varying the other. The construction also permits a variation in speed or rate of travel of one of the mechanisms in relation to the other and moreover by the practice of the present invention, the amount of travel of the first of these mechanisms may be varied relative to the amount of travel of the second.

An additional object is that of providing a scale which will efficiently perform the purposes for which it is intended and which will also be economically and readily manufactured and assembled.

Other objects of the invention will in part be obvious and will in part appear hereinafter.

The invention accordingly comprises the features of construction, combinations of elements, and arrangement of parts, which will be exemplified in the construction hereinafter set forth and the scope of the application of which will be indicated in the claims.

Figure 5:
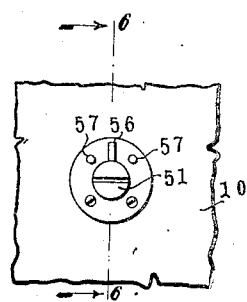
Figure 6:
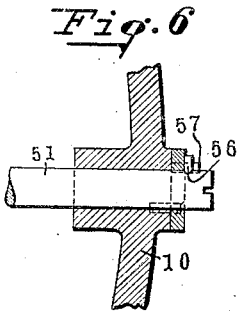
Figure 2:
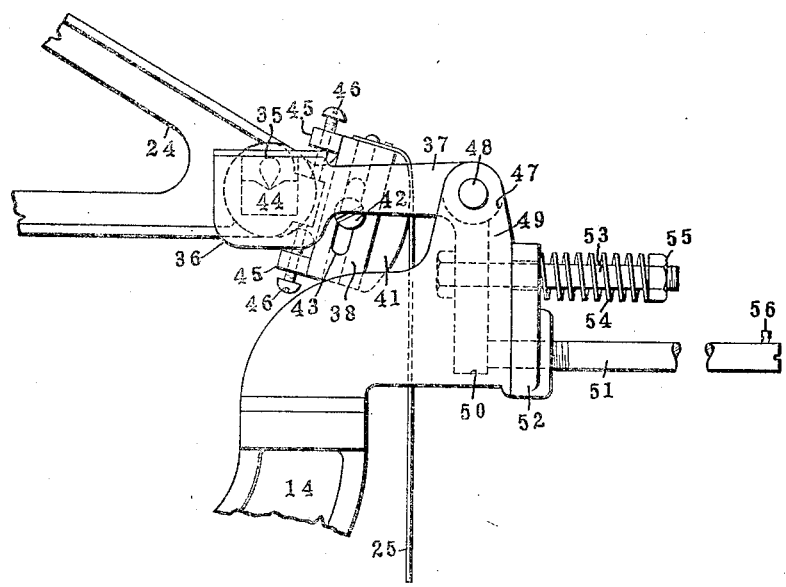
Figure 2:
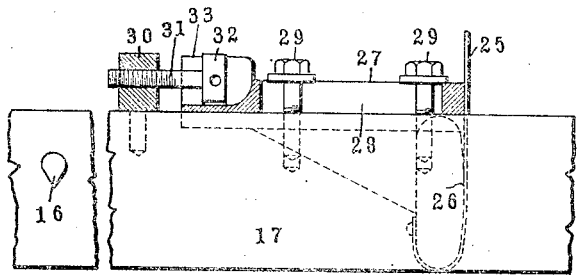
Figure 4:
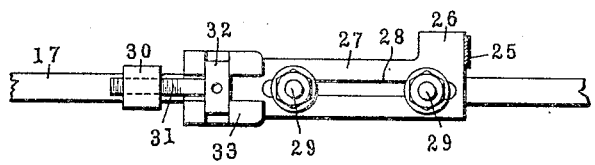
Figure 3:
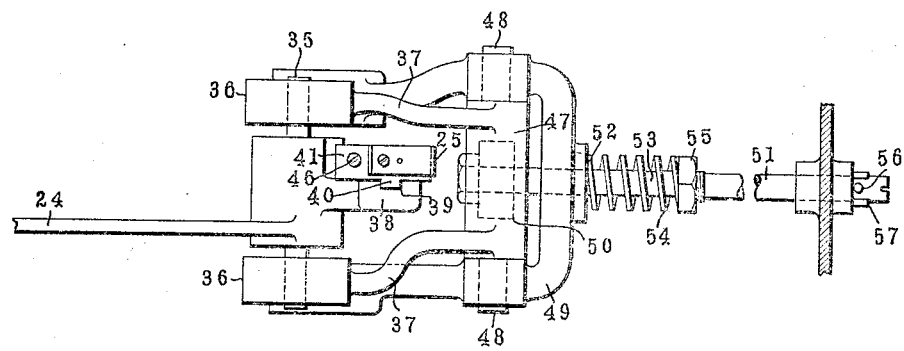
Figure 7:
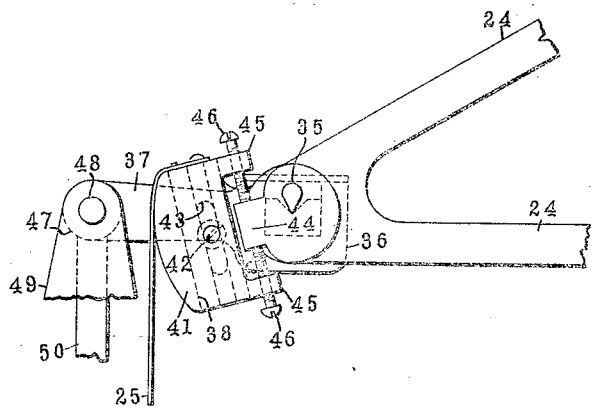
Figure 8:
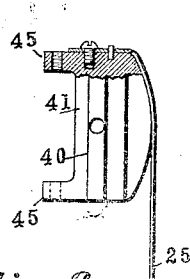

For a fuller understanding of the nature and objects of the invention reference should be had to the following detailed description taken in connection with the accompanying drawings, in which:

Figure 1 is a partly sectional, fragmentary front elevation of the upper portion of a scale embodying one form of construction within the terms of the present invention, Fig. 2 is a partly sectional, fragmentary side elevation of a portion of the scale mechanism, Fig. 3 is a plan view of the upper parts of the mechanism as illustrated in Fig. 2, Fig. 4 is a fragmentary plan view of the lower portion of the mechanism as illustrated in Fig. 2, Fig. 5 is an enlarged fragmentary edge view of a section of the housing thereof, Fig. 6 is a fragmentary sectional view taken along the lines 6—6 and in the direction of the arrows indicated in Fig. 5, Fig. 7 is a fragmentary rear view of a portion of the upper part of the mechanism as shown in Fig. 2, and Fig. 8 is a partly sectional side elevation of one of the elements forming a part of the construction of this invention as shown in certain of the foregoing views.

It will be seen, reference being had to Fig. 1, that a scale has been illustrated which includes a housing 10, mounting a registering mechanism of any desirable character such as, for example, a suitably graduated dial 11, and a pointer 12, the dial and pointer being movable one relative to the other.

Disposed within the housing is a weighing mechanism which in the present instance embraces a supporting member 13 to which a standard 14 is attached, the member also carrying bearings 15, supporting a pivot pin 16 in turn carried by a beam 17, so that the latter is free to fulcrum about this point.

Connected with the beam 17 by any suitable means, such as for example a pivotally attached link 18, is the load receiving portion of the scale, (not shown) and it will be obvious that upon an article being associated with this part an impulse will be transmitted to the beam 17 and tend to cause the same to be rocked.

In order to provide a counterpoise in operative association with the scale mechanism, it will be perceived in the present embodiment, that one of the arms of the standard 14 carries a pivotally mounted pendulum weight 19 which is connected in any suitable manner such as, for example, by a tape 20, with the beam, it being noted that pivotal attachment of the end of the tape and the beam may be furnished in any desirable manner.

Carried by another arm of the standard 14 is a shaft 21 to which the pointer 12 is secured, and a pinion 22 may be attached to this shaft and engaged by a movable rack in order to rotate the shaft 21 and consequently move the pointer relative to the dial. This rack is provided in the present instance, by forming a series of teeth 23 in the edge of an arcuate member 24 which is rockingly and suitably supported in a manner hereinafter brought out.

If now, the weighing mechanism and the member 24 are suitably connected as, for example, by utilizing a tape 25 which has one of its ends connected with the member 24 and beyond the pivot thereof, its opposite end being connected with the beam 17, it will be obvious that as the latter moves the member 24 will be proportionately moved and assuming that a correct ratio exists and the parts are properly correlated, it will be apparent that the degree of movement of the weighing mechanism (in the present instance the beam 17) will serve by means of the dial 11 operating in conjunction with the pointer 12, to register the weight value of an article placed upon the weight receiving portion of the scale.

It will be appreciated that due to inequalities in manufacture and for other reasons, a proper ratio of movement between the parts of the weighing and registering mechanisms, relative to one another, will not at all times exist and with a view to establishing a correct cooperation and relationship in order to insure the accuracy of the registered result, certain constructions have been herewith illustrated.

Thus, reference being had to Figs. 1, 2 and 4, it will be perceived in the present embodiment, that the tape 25 has its lower end attached to the shoulder 26 of a block 27. The outer face of this shoulder is preferably curved in a manner corresponding to the arcuate movement of the beam 17 and the body of the tape 25 is in engagement with this face as has been clearly brought out in Fig. 2. The block 27 is slidable towards and away from the beam pivots and in order to properly guide these movements and to lock the parts the block may be mounted by providing a slot 28 in its body and attaching clamping screws 29 to the upper edge of the beam in such a manner that the bodies of these screws extend through the slot 28, the heads thereof being capable of exerting a clamping action. With a view of positively shifting the block relative to the beam, the latter may carry a screw-threaded bearing 30, through which a correspondingly threaded rod 31 extends, this rod terminating in a head 32 lying within a suitably shaped retaining portion 33 forming a part of the block, it being understood that when the rod 31 is rotated relative to the block and bearing 30, the desired movements of the parts will be accomplished. In other words the block will be moved towards or away from the pivot 16, after which the parts may be locked by simply tightening the screws 29.

Obviously, by means of the adjustment thus furnished, the lower end of the tape 25 may be moved along the beam with that degree of accuracy most conducive to the accomplishment of accurate results. It will be perceived that the shifting of this end of the tape serves incident to the increased or decreased leverage exerted thereon by the beam, 17, to first vary the strength of the pull exerted by this connecting member, secondly, to increase or decrease the rate of travel of the rod and thirdly to change the amount of travel of the connecting member, and consequently the parts of the registering mechanism associated therewith.

The member 24 being pivotally mounted, it will be understood that as that end of the tape 25 which is connected to the beam 17 is moved relative to the latter, the effective length of this connecting member is correspondingly lengthened and shortened. Obviously, if the other end of the tape were held immovable, this action would result in the same being subjected to varying degrees of tension. However, due to the fact that the upper end of this tape is connected with the member 24, and exerts its influence to one side of the point of pivotal support thereof, the shifting of the lower end of the tape (conceding that the beam is held stationary) would result in the arcuate member being moved and due to the fact that the latter operates the registering mechanism, this movement would in most instances cause a faulty reading thereof, it being noted that if necessary any suitable means such as a weight 34, may be attached to the member 24 at a point to the other side of its point of pivotal mounting so as to insure a maintenance of a constant tension on the tape 25.

In order to overcome this difficulty a suitable mechanism has been illustrated in Figs. 2, 3, 7 and 8. In these views it will be seen that the pivotal mounting of the member 24 is accomplished by having the same carry a pin 35 which rests upon bearings 36 carried one by each of a pair of arms 37, the member 24 being extended beyond this pivot as has been indicated at 38. In the present exemplification, this extended portion is provided with a groove 39 within which the tongue 40 of a block 41 rides. Thus, the block is capable of guided movement relative to the member 24 and in order to prevent any accidental separation of these parts, it will be perceived that the block may carry a headed pin 42 which extends through and rides within a slot 43 paralleling the tongue and groove construction. In order to accurately and positively move the block relative to the member 24, the latter may be formed with a lug 44 while the former has a pair of lips 45 overlying and spaced from the lug. These lips are each formed with a screw-threaded opening and opposed set screws 46 are disposed one within each of these openings and have their inner ends bearing against the opposite faces of the lug 44. Thus, upon one of the screws being retracted and the other one being projected, it will be understood that the block 41 may be moved relative to the member 24, and adjusted to exactly the position which it is to occupy.

This latter adjustment has the effect that after that end of the tape which is connected with the weighing mechanism, per se, is adjusted relative to the same, the opposite end thereof may also be adjusted in order that the radius will remain equal and thus maintain the proper position of the registering mechanism to compensate for errors which would otherwise occur.

In addition, it will be perceived that by the adjustment provided, the block 41 upon being shifted with respect to the member 24 will assume a more or less eccentric position relative to the pivot of the latter. Due to this shifting of the parts, it is practicable to avoid any adjustment of the pendulum which latter adjustment if resorted to, would change the relative operative ratio of the mechanism, thus setting up a series of errors which would have to be compensated for. Thus, the relationship of the pendulum 19 to the other parts of the mechanism may remain constant and any adjustment which may be found desirable can be accomplished by simply varying the eccentric relationship of the block 41 relative to the member 24.

Finally, in order to correct slight inaccuracies which may be caused by different factors, it will be noted that arms 37 are carried upon a hub 47 having reduced portions 48 journaled within a bracket 49 supported by the standard 14. The hub 47 has a further arm 50 extending, for example at right angles to the arms 37 so that these elements provide what might be termed a bell crank. A screw-threaded pin 51 may extend through a correspondingly threaded opening in a plate 52 which forms a part of the bracket 49, and it will be perceived from the foregoing, that the bell crank structure may be rocked assuming the arm 50 to be in contact with the pin 51, by simply projecting or retracting the latter relative to the bracket 49. To assure the contact between the arm and pin, any suitable means may be employed such as, for example, a spring-pressed bolt 53 which has its body extending through openings in the plate 52 and arm 50, its head bearing against the outer face of the latter, it being further noted that the spring 54 carried by the bolt is interposed between the outer face of the plate 52 and a nut 55 carried by the bolt and movable relative thereto, whereby the force exerted by the spring may be varied.

As has been clearly brought out in Figs. 5 and 6, the pin 51 has its outer end preferably extending through an opening in the housing 10, and in order to limit the movements (i. e. turning) of the pin and consequently its projection and retraction, the latter may carry an arm 56 at a point beyond the housing which arm, in conjunction with stationary pins 57 affixed to the housing, acts as a stop, thus limiting the movements of the parts. However, it will be understood that the movement provided for is sufficient to rock the bell crank and consequently shift the pivot of the member 24 so that the reading of the registering mechanism may be varied by the operator of the scale to an extent sufficient to compensate for slight inaccuracies in zero balance, the necessity for this adjustment being usually indicated by the fact that the pointer 12, when the scale is without load, will not align with the zero graduation on the dial.

In use it will be appreciated, assuming that the subject matter of the present invention is utilized in connection with a scale of the particular type described, and that the construction of the elements forming a part of the invention are substantially as shown, that after the parts have been assembled in the manner shown in Fig. 1, the operator primarily assures himself that the parts of the weighing mechanism are in proper relation. After this fact has been established, the pointer 12 is brought into registry with the proper graduations of the dial 11, this operation being accomplished in any desirable manner, as for example, by moving the member 24 relative to the pinion 22. Tests are now resorted to covering the full range of the scale, these tests being usually made by the use of articles, the weight value of which is exactly known, the result registered by the scale being thus checked. If now, these results are found to be inaccurate, the errors of the weighing mechanism may be compensated for by simply shifting the lower end of the tape 25 towards or away from the beam pivot 16. It is obvious that this shifting will cause the tape to move through a greater or lesser path than that which it initially traversed, resulting in the member 24 swinging upwardly or downwardly to compensate for the change in operative length of the tape 25. Either of these movements on the part of the member 24 will result in the reading of the registering mechanism being changed and in order to correct this reading the block 41 it shifted, to thus compensate for the increase or decrease of operative length of the tape 25 without necessitating any alteration or shifting of the parts of the weighing mechanism, and it will be understood that this latter adjustment, by means of the mechanism used in the present embodiment, is so delicate that the pointer and dial may be brought to exactly that position which is desired or which is necessary.

It will also be understood that due to the manner in which the block 41 and member 24 are eccentrically disposable relative to one another, adjustments which might be necessary could be made by varying the eccentricity of the block to thus correct errors which might have occurred. The tape will obviously move, upon the weighing mechanism moving, and by means of the adjustment provided at the point of connection of the lower end of the tape 25 with the beam 17, this movement is such that the result is accurately registered. It might thus be said that the point of application of the registering mechanism to the weighing mechanism is altered in that the connecting member which moves the indicating mechanism is shifted relative to and actuated by this weighing mechanism. The tester is able to seal the scale housing with assurance that the weight value of an article as registered by the scale may be relied upon irrespective of whether the article is of a small or relatively great weight.

It will be understood that this expedient provides a material improvement over scales as generally constructed heretofore in that it has been usual in pendulum beam and spring scales to resort to adjustments which resulted in a change in the relationship of the parts of the weighing mechanism or spring tension, this change being obviously reflected in a new set of errors affecting the accuracy of indication through certain ranges of the weighing mechanism.

After the parts have been properly correlated, no further necessity for adjustment will exist under normal conditions of operation with the exception that the scale attendant may establish zero balance, without affecting the accuracy of the registered result, by simply moving the pin 51 in order to shift the pivot of the member 24 and to thus bring the pointer 12 into registration with the initial graduation of the dial when the weighing mechanism is in neutral or zero position.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A scale including, in combination, a weighing mechanism, a registering mechanism, means connecting the mechanisms, a pivotally mounted element, forming a part of said registering mechanism, a movable support for said element and a member having screw threads, said member co-operating with said support to shift the same.

2. A scale including, in combination, a weighing mechanism, a registering mechanism, means connecting the mechanisms, a pivotally mounted element, forming a part of said registering mechanism, a movable support for said element, a member having screw threads, said member co-operating with said support to shift the same, and means for maintaining the proper relationship between said member and said support.

3. A scale including, in combination, a registering mechanism, a weighing mechanism including a pivotally mounted beam, a connecting member extending between said beam and registering mechanism, and means including a screw movable towards and away from said connecting member to said beam whereby the distance between the point of attachment and the registering mechanism may be varied.

4. A scale including, in combination, a registering mechanism, a weighing mechanism including a pivotally mounted beam, a connecting member extending between said beam and registering member, means including a screw movable towards and away from said beam pivot and attaching said connecting member to said beam whereby the distance between the point of attachment and the registering mechanism may be varied and means associating with said registering mechanism whereby the effective length of said connecting member may be maintained substantially constant.

5. In a weighing scale, the combination with a pivoted arm, of an actuating element therefor, said element being secured to said arm on one side of its pivotal point, and means interposed between the element and the arm for shifting their respective relative positions independently of said pivot.

6. In a weighing scale, the combination with a pivoted arm, of an actuating element therefor, said element being secured to said arm on one side of its pivot point, and means interposed between the element and the arm for vertically shifting their respective relative positions.

In testimony whereof I affix my signature.
ELMER E. WOLF.
In testimony whereof I affix my signature.
LOUIS A. OSGOOD.